United States Patent [19]

Larson

[11] Patent Number: 5,776,549
[45] Date of Patent: Jul. 7, 1998

[54] BONDING POLYSULFIDE SEALANT TO SILICONE

[75] Inventor: Kent Robert Larson, Midland, Mich.

[73] Assignee: Dow Corning Corporation, Midland, Mich.

[21] Appl. No.: 878,274

[22] Filed: May 4, 1992

Related U.S. Application Data

[62] Division of Ser. No. 642,760, Jan. 18, 1991, Pat. No. 5,145,918.

[51] Int. Cl.⁶ .................... B05D 1/36; B05D 7/02
[52] U.S. Cl. .................. 427/419.7; 427/387; 427/393.5; 427/412.1
[58] Field of Search .................. 427/207.1, 412.1, 427/419.7, 387, 393.5

[56] References Cited

U.S. PATENT DOCUMENTS

| | | | |
|---|---|---|---|
| 2,466,963 | 4/1949 | Patrick | 260/79.1 |
| 2,964,503 | 12/1960 | Carpenter et al. | 260/79.1 |
| 3,123,495 | 3/1964 | Carpenter et al. | 117/72 |
| 3,297,473 | 1/1967 | Bulbenko | 117/72 |
| 3,312,669 | 4/1967 | Giordano | 260/79.1 |
| 3,317,461 | 5/1967 | Plueddemann | 260/16.5 |
| 3,334,067 | 8/1967 | Weyenberg | 525/477 |
| 3,457,099 | 7/1969 | DeAugelo, Jr. | 117/75 |
| 3,476,826 | 11/1969 | Millen | 525/474 |
| 3,499,859 | 3/1970 | Matherly | 524/701 |
| 3,561,996 | 2/1971 | Young | 427/412.1 |
| 3,708,467 | 1/1973 | Smith et al. | 525/477 |
| 3,837,876 | 9/1974 | Mayuzumi et al. | 106/287.11 |
| 4,015,044 | 3/1977 | Ranney et al. | 428/419 |
| 4,020,218 | 4/1977 | Ranney et al. | 428/447 |
| 4,059,473 | 11/1977 | Okami | 427/387 |
| 4,898,910 | 2/1990 | Kamis et al. | 524/860 |
| 5,071,907 | 12/1991 | Nakata et al. | 524/588 |

*Primary Examiner*—Diana Dudash
*Attorney, Agent, or Firm*—Jennifer S. Warren

[57] ABSTRACT

A composition useful for adhering polysulfide sealant to silicone sealant or to silicone sealant contaminated surfaces is obtained by mixing 1 part by weight of alkoxy functional, titanate catalyzed silicone sealant with from 0.1 to 40 parts by weight of polysulfide sealant.

3 Claims, No Drawings

BONDING POLYSULFIDE SEALANT TO SILICONE

This is a divisional of copending application Ser. No. 07/642,760 filed on Jan. 18, 1991, now U.S. Pat. No. 5,145,918.

BACKGROUND OF THE INVENTION

1. Field of the Invention

This invention relates to a method of bonding polysulfide sealant to a cured silicone elastomer.

2. Background Information

Both silicone sealants and polysulfide sealants are used on aircraft. In some instances, it is desirable to obtain a good bond between them when one is placed over the other.

Polysulfide compositions and their cure are taught in U.S. Pat. No. 2,964,503, issued Dec. 13, 1960. The polyalkylene polysulfide polymers can exist in solvent free, flowable liquid polymer form, which polymers are cured with a soluble salt of chromic acid. This patent teaches addition of a modifying and solubilizing agent selected from a stated group of liquids having a melting point below about 20° C. and a boiling point above about 125° C.

Curable liquid polyfunctional polysulfide polymer having reactive mercaptan groups are combined with an organic-silane and a curing agent to make a sealant composition is U.S. Pat. No. 3,123,495, issued Mar. 3, 1964. The silane is intended to aid in the resistance of the bond of the sealant to substrate to the detrimental effects of ultraviolet light. The organic-silanes are those having one or more alkoxy, aryloxy, acyloxy, amino, or vinyl groups in them. Especially useful are silanes having a vinyl or amine group and one or more alkoxy groups.

The use of beta-mercapto alkyl amino alkyl trialkoxy silanes as primers or additives for polysulfide polymer based sealants and caulking compounds is taught: in U.S. Pat. No. 3,297,473, issued Jan. 10, 1967. The silane improved the adhesion, particularly in the presence of polar solvents such as water.

Polythiopolymercaptan polymers as disclosed in U.S. Pat. No. 2,466,963 are improved in adhesion by the addition of an adhesive additive compound having the structure HS—R—Si—(OR')$_3$. This composition and the process are claimed in U.S. Pat. No. 3,312,669, issued Apr. 4, 1967.

A moisture curable polysulfide composition is disclosed in U.S. Pat. No. 3,317,461, issued May 2, 1967. A polysulfide polymer is reacted with a vinyl silane to give a polysulfide endblocked with silyl groups which react upon exposure to moisture to provide crosslinking.

A curable, liquid polysulfide polymer based sealant is bonded to a substrate by priming the substrate with a primer containing at least one organic silane compound and at least one Friedel-Crafts compound, applying the curable composition to the primed substrate and curing the composition on the substrate. This process is claimed in U.S. Pat No. 3,457,099, issued Jul. 22, 1969.

U.S. Pat. No. 3,476,826, issued Nov. 4, 1969, teaches polysulfide polymers having pendant organo-silane radicals containing hydrolyzable groups are effective as adhesion additives or primers for high rank polysulfide polymer compositions used as sealants or bonding agents on various substrates.

A process which uses a bis-trialkoxysilylorgano polysulfide compound as a primer for bonding polyurethane sealants and caulks to solid inorganic surfaces is taught in U.S. Pat. No. 4,015,044, issued Mar. 29, 1977.

U.S. Pat. No. 4,020,218, issued Apr. 26, 1977, discloses a process for enhancing the bonding of polysulfide sealant to solid inorganic substrates by providing an interface of a silane or its hydrolyzate having a bicyclopentenyl or mercaptonorbornyl containing radical.

SUMMARY OF THE INVENTION

A composition comprising a mixture of titanium catalyzed, alkoxy functional, moisture cured silicone sealant and polysulfide sealant is used as a primer on substrates of silicone elastomer or silicone elastomer contaminated substrates when bonding polysulfide sealant to the substrate or as a sealant which adheres to substrates including silicone, polysulfide, and metals.

DESCRIPTION OF THE INVENTION

This invention relates to a composition consisting essentially of 1 part by weight of silicone sealant comprising a hydroxyl endblocked polydiorganosiloxane, a silane or silane mixture having an average of from 2.01 to 4 inclusive alkoxy radicals, and a titanium catalyst which cures at room temperature upon exposure to moisture and from 0.1 to 40 parts by weight of polysulfide sealant, and to the composition used as a primer for bonding polysulfide sealant to a substrate of silicone elastomer or a substrate contaminated with silicone elastomer.

One and two part polysulfide sealants are commonly used on aircraft as fairing seals and as moisture vapor barriers. A number of patents have been granted which show various methods of improving the bonding of polysulfide sealants to various substrates. One of the most difficult bonding problems has been the use of polysulphide sealants in conjunction with silicone sealants. Problems arise when the polysulfide is applied over a silicone sealant, or is applied to a surface which has been contaminated by a silicone sealant. Perhaps an operator handled a silicone sealant and got some on the skin, then handled a substrate, transferring a film of silicone to the substrate. The composition of this invention can be applied to such silicone containing substrates as a primer, then a polysulfide sealant can be applied over the primer and a strong bond achieved.

The composition is a physical blend of 1 part by weight of silicone sealant and from 0.1 to 40 parts by weight of polysulfide sealant. The silicone sealant is of the type comprising a hydroxyl endblocked polydiorganosiloxane, a silane or silane mixture having an average of from 2.01 to 4 inclusive alkoxy radicals, and a titanium catalyst. The sealant cures upon exposure to the moisture in the air. This class of silicone sealants is well known in the art and can be illustrated by reference to U.S. Pat. Nos. 3,334,067, issued Aug. 1, 1967; 3,499,859, issued Mar. 10, 1970; 3,689,454, issued Sep. 5, 1972; and 3,708,467, issued Jan. 2, 1973. All of the above patents are incorporated by reference to show the silicone sealant and it's method of manufacture.

Polysulfide sealants are also well known in the art. They consist essentially of a polysulfide polymer, curing agent, and filler. The polymer can be a liquid polysulfide polymer having mercaptan terminal and side groups capable of further polymerization and cross linkage. The curing agents are generally oxidizing agents such as lead dioxide, manganese dioxide, calcium peroxide, and various chromate salts such as are disclosed in U.S. Pat No. 2,964,503, issued Dec. 13, 1960. Polysulfide sealants are illustrated in U.S. Pat. Nos. 3,123,495, issued Mar. 3, 1964; 3,297,473, issued Jan. 10, 1967; 3,312,669, issued Apr. 4, 1967; and 3,457,099, issued Jul. 22, 1969.

The composition of this invention is obtained by intimately mixing the silicone sealant and the polysulfide sealant together. Since the silicone sealant is moisture sensitive, this mixing of the silicone sealant and the polysulfide sealant must be done in the absence of moisture, and stored in the absence of moisture. The polysulfide sealants are normally two part systems, with the catalyst added at the time of use. The preferred method of this invention is mixing of the silicone sealant into the base portion of the polysulfide sealant in the absence of moisture and storage in the absence of moisture to give part A. The polysulfide catalyst is then part B. At the time of use, the catalyst for the polysulfide, part B, is added to part A, and the mixed primer is applied to the substrate. The polysulfide sealant is then applied over the primer and the primer and sealant are allowed to cure together. The maximum amount of polysulfide sealant added to 1 part of silicone sealant is about 40 parts. More than that, for example 50 parts, has been shown to give poor adhesive results when tested on a silicone substrate. As little as 0.1 part of polysulfide per 1 part of silicone sealant has been shown to give good cohesive failure between the composition and a polysulfide sealant applied over the composition when the composition is used as a primer. If no polysulfide is added to the silicone sealant, a polysulfide sealant will not adhere to the composition, when the composition is used as a primer.

When used as a primer, the composition is applied to the silicone elastomer substrate, or substrate contaminated with silicone elastomer, in at least a continuous film. There is no particular amount of the composition which must be applied, as long as a continuous film is present, layers of about ⅛ inch have been found convenient for testing purposes. After the composition is applied, the composition may be allowed to cure and the polysulfide sealant applied at a later time, or the polysulfide sealant may be applied immediately after the composition is applied and the two allowed to cure together. It is preferred that the composition and the polysulfide sealant be allowed to cure together; but excellent adhesion results have been obtained when the composition is applied and cured, the polysulfide sealant is applied over the cured composition and then allowed to cure.

The composition can also be used by itself as a sealant which will adhere to a silicone elastomer substrate or substrate contaminated with silicone elastomer. Paint can be applied to a substrate which is a silicone elastomer or contaminated with silicone elastomer by applying a coating of the composition to the substrate, applying a coating of polysulphide over the composition coating, allowing the combination to cure, and then painting over the exposed polysulfide.

The following examples are included for illustrative purposes only and should not be construed as limiting the invention which is properly set forth in the appended claims.

EXAMPLE 1

A test mixture, A, was prepared by mixing together 1 part of a silicone moisture curing sealant and 1 part of a chromium curing two part polysulfide (PRC PR-1440). The moisture curing silicone sealant was a mixture of about 78 parts of hydroxyl endblocked polydimethylsiloxane having a viscosity of about 4.0 Pa.s at 25° C., 15 parts of fume silica having a surface area of about 250 m2/g and a surface treated with hexamethyldisilazane, 6 parts of a mixture of commercial grade methyltrimethoxysilane and a UV dye which can be used to show the presence of the coating when exposed to UV light, and 0.5 part of tetrabutyltitanate. The two part polysulfide was mixed at a ratio of 10 parts of the base to 1 part of the curing agent.

A test substrate was prepared by mixing together a two part silicone elastomer then spreading the mixture out to form a test slab and curing for 1 hour at 150° C. and 1 hour at 200° C. The two part silicone elastomer consisted of 10 parts of a base which was a mixture of about 39 parts of dimethylvinylsiloxy endblocked polydimethylsiloxane having a viscosity of about 2.1 Pa.s at 25° C. and a vinyl content of about 0.1 weight percent, 23 parts of fume silica having a surface area of about 250 m2/g which had been in situ treated to give a trimethylsiloxy treated surface, 8 parts of vinyl containing silicone resin, 3 parts of titanium dioxide, 21 parts of dimethylvinylsiloxy endblocked polydimethylsiloxane having a viscosity of about 10 Pa.s at 25° C., and 0.2 part of chloroplatinic acid complex of divinyltetramethyldisiloxane diluted with dimethylvinylsiloxy endblocked polydimethylsiloxane to provide 0.7 weight percent platinum; and 1 part of curing agent which was a mixture of 42 parts of the above dimethylvinylsiloxy endblocked polydimethylsiloxane, 22 parts of the vinyl containing silicone resin, 35 parts of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent , and 1.3 parts of methylvinylcyclosiloxane.

A test construction was prepared by spreading a ⅛ inch thick layer of mixture A, above, on the surface of the above described test substrate. The mixture was allowed to cure at room temperature for 1 week. When the cured mixture A was peeled from the test substrate, the failure was 100 percent cohesive with the failure within mixture A.

EXAMPLE 2

A cured sample of the above described test substrate was coated with a ⅛ inch thick layer of the above described test mixture A. After less than 10 minutes, a ¼ inch thick layer of the catalyzed polysulfide described above was placed over the mixture A. The construction was allowed to cure for 1 week at room temperature. When the construction was peeled apart, failure was 100 percent cohesive between the cured silicone and the mixture A, with the failure being of the mixture, and 100 percent cohesive between the mixture A and the polysulfide, with the failure being of the mixture.

EXAMPLE 3

A test mixture, B, was prepared by mixing together 1 part of a silicone moisture curing sealant and 1 part of the polysulfide of Example 1.

The silicone moisture curing sealant was a mixture of about 70 parts of a mixture of hydroxyl endblocked polydimethylsiloxane with an approximate number average molecular weight of 40,000 with cyclic polydimethylsiloxane with a degree of polymerization of from 4 to 30, the mixture having a viscosity of about 13.5 Pa.s at 25° C., 22.5 parts of the silica of Example 1, 7 parts of commercial grade methyltrinethoxysilane, and 0.5 part of tetrabutyltitanate.

A test construction was prepared as in Example 1, but using mixture B above, instead of mixture A. The sample was tested as in Example 1, with failure being 100 percent cohesive, with the failure being within mixture B.

EXAMPLE 4

A test mixture, C., was prepared as in Example 1, but using 1 part of the silicone moisture curing sealant and 2 parts of the catalyzed polysulfide.

When a test construction was prepared and tested as in Example 1, the failure was 100 percent cohesive, with the failure being within mixture C.

EXAMPLE 5

A test mixture, D, was prepared as in Example 1, but using 1 part of the silicone moisture curing sealant and 10 parts of the catalyzed polysulfide.

When a test construction was prepared and tested as in Example 1, the failure was 100 percent cohesive, with the failure being within mixture D. The construction was qualitatively lower in adhesive strength than the result of Example 1 or 4.

EXAMPLE 6

A test mixture, E, was prepared by mixing together 1 part of a different silicone moisture curing sealant and 1 part of the polysulfide of Example 1.

The silicone moisture curing sealant was a mixture of about 100 parts of hydroxyl endblocked polytrifluoropropyl (methyl)siloxane having a viscosity of about 50 Pa.s, 10 parts of the fume silica used in Example 1, 10 parts of titanium dioxide, 8 parts of vinyltriacetoxysilane, 2 parts of reaction product of vinyltriacetoxysilane and t-butanol, and 0.1 part of dibutyltindiacetate.

This mixture of acetoxy functional silicone sealant and polysulfide reacted upon mixing to give a mixture, when applied to the substrate of Example 1 cured with no adhesion

EXAMPLE 7

A test mixture F was prepared by mixing together 1 part of a silicone sealant which cured through the tin catalyzed reaction of alkoxy groups on silicon and 1 part of the polysulfide of Example 1. The mixture did not cure properly, so no further testing was done.

EXAMPLE 8

A test mixture prepared by mixing 1 part of a silicone composition which cures through the platinum catalyzed reaction of vinyl on silicon with hydrogen on silicon will not cure properly when mixed with 1 part of the polysulfide of Example 1, therefore it does not function in this invention.

EXAMPLE 9

When a test mixture G was prepared by mixing 1 part of a silicone composition which cures through the tin catalyzed reaction of oximosilanes and moisture with 1 part of the polysulfide of Example 1, the primer cured properly, but when tested as in Example 1, there was no useful adhesion between the test mixture and the silicone substrate.

EXAMPLE 10

The polysulfide composition of Example 1 was mixed with 2 percent by weight of methyltrimethoxysilane and applied to the silicone substrate of Example 1. There was no appreciable adhesion to the silicone substrate. When the experiment was repeated using 5 weight percent of the silane, the result was the same.

EXAMPLE 11

The polysulfide composition of Example 1 was mixed with an equal amount of the hydroxyl endblocked polydimethylsiloxane used in the manufacture of the silicone moisture curing sealant used in Example 1. When applied to the silicone substrate of Example 1 and cured, there was no useful adhesion.

EXAMPLE 12

The test mixture A of Example 1 was applied to uncleaned aluminum, uncleaned stainless steel, silicone contaminated aluminum, and silicone contaminated stainless steel. After allowing it to cure, it was tested for adhesion and found to adhere cohesively to all of the substrates.

EXAMPLE 13

A series of test mixtures were prepared to evaluate the ratios of silicone moisture curing sealant to polysulfide sealant which could be used. The silicone moisture curing sealant and the polysulfide of Example 1 were mixed in the various ratios shown in Table I to form a composition, then applied to the silicone sealant substrate as in Example 1 and tested for adhesion. The results are shown in Table I.

TABLE I

| Silicone Sealant parts | Polysulfide Sealant parts | Percent Cohesive Failure |
|---|---|---|
| 1 | 50 | 0 |
| 1 | 100 | 0 |
| 1 | 0.1 | 100 |
| 1 | 0.2 | 100 |
| 1 | 0.5 | 100 |
| 1 | 0.0 | 100 |

In each case where there was cohesive failure, the failure occurred within the composition.

In the case of the compositions made with from 0.0 to 0.5 part of polysulfide, samples were also prepared in which polysulfide sealant was placed over the composition and cured, as in Example 2. The polysulfide sealant was then pealed from the composition with the results shown in Table II.

TABLE II

| Polysulfide Sealant per part Silicone Sealant | Percent Cohesive Failure |
|---|---|
| 0.0 | 0 |
| 0.1 | 100 |
| 0.2 | 100 |
| 0.5 | 100 |

In each case where there was cohesive failure, the failure occurred within the composition.

That which is claimed is:

1. A method of priming a substrate comprising a silicone elastomer or silicone elastomer contaminated surface, the method comprising:

applying to the substrate a composition consisting essentially of
(a) 1 part by weight of silicone sealant which includes a hydroxyl endblocked polydiorganosiloxane, a silane or silane mixture having from 2.01 to 4 inclusive alkoxy radicals, and a titanium catalyst and which cures upon exposure to moisture; and
(b) 0.1 to 40 parts by weight of polysulfide sealant.

2. A method of bonding a polysulfide sealant to a cured silicone elastomer, the method consisting essentially of:

(a) applying to the surface of the cured silicone elastomer a composition consisting essentially of
  (i) 1 part by weight of silicone sealant which includes a hydroxyl endblocked polydiorganosiloxane, a silane or silane mixture having an average of from 2.01 to 4 inclusive alkoxy radicals, and a titanium catalyst and which cures at room temperature upon exposure to moisture; and
  (ii) 0.1 to 40 parts by weight of polysulfide sealant; and (b) then applying a polysulfide sealant over the composition.

3. The method of claim 2 in which the polysulfide sealant is applied to the surface of the composition before the composition is allowed to cure, then allowing the materials to cure simultaneously.

* * * * *